US010618511B2

(12) United States Patent
Laine et al.

(10) Patent No.: US 10,618,511 B2
(45) Date of Patent: Apr. 14, 2020

(54) METHOD FOR CONTROLLING A HYDRAULIC HYBRID VEHICLE

(71) Applicant: VOLVO TRUCK CORPORATION, Göteborg (SE)

(72) Inventors: Leo Laine, Härryda (SE); Lena Larsson, Västra Frölunda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 259 days.

(21) Appl. No.: 15/737,332

(22) PCT Filed: Jul. 2, 2015

(86) PCT No.: PCT/EP2015/065078
§ 371 (c)(1),
(2) Date: Dec. 18, 2017

(87) PCT Pub. No.: WO2017/001017
PCT Pub. Date: Jan. 5, 2017

(65) Prior Publication Data
US 2018/0170344 A1    Jun. 21, 2018

(51) Int. Cl.
*B60W 10/22*       (2006.01)
*B60W 20/10*       (2016.01)
(Continued)

(52) U.S. Cl.
CPC ............ *B60W 20/10* (2013.01); *B60K 6/12* (2013.01); *B60K 6/52* (2013.01); *B60K 17/16* (2013.01);
(Continued)

(58) Field of Classification Search
CPC ...... B60W 20/10; B60W 10/04; B60W 10/06; B60W 10/08; B60W 10/22; B60W 20/00;
(Continued)

(56) References Cited

U.S. PATENT DOCUMENTS

| 4,854,409 A | 8/1989 | Hillebrand et al. |
| 5,332,052 A | 7/1994 | Carnevale |

(Continued)

FOREIGN PATENT DOCUMENTS

| DE | 19718709 A1 | 11/1997 |
| DE | 102007053266 A1 | 5/2009 |

(Continued)

OTHER PUBLICATIONS

International Search Report (dated Mar. 3, 2016) for corresponding International App. PCT/EP2015/065078.

*Primary Examiner* — Gertrude Arthur Jeanglaude
(74) *Attorney, Agent, or Firm* — Withrow & Terranova, PLLC

(57) ABSTRACT

A method is provided for controlling a hydraulic hybrid vehicle, the hydraulic hybrid vehicle including: a first pair of wheels and a second pair of wheels; an internal combustion engine connected to the first pair of wheels for propelling the hydraulic hybrid vehicle; and a hydraulic propulsion system including a first hydraulic machine connected to the second pair of wheels, the method including the steps of; receiving a signal indicative of a driving condition, including vehicle speed, of the hydraulic hybrid vehicle; comparing the vehicle speed of the driving condition of the hydraulic hybrid vehicle with an upper predetermined threshold speed limit; determining if the vehicle speed of the driving condition is higher than the upper predetermined threshold speed limit; and when the vehicle speed is higher than the upper predetermined threshold speed determining, based on the driving condition, control parameters for operating the first hydraulic machine; and controlling the control parameters of the first hydraulic machine for operating the first hydraulic machine. The invention also relates to a control unit and a hydraulic hybrid vehicle.

24 Claims, 4 Drawing Sheets

(51) Int. Cl.
*B60K 6/12* (2006.01)
*B62D 53/08* (2006.01)
*B60W 10/08* (2006.01)
*B60K 6/52* (2007.10)
*B60W 20/00* (2016.01)
*B60W 30/18* (2012.01)
*B60K 17/16* (2006.01)
*B60W 10/04* (2006.01)
*B60W 10/06* (2006.01)
*B60W 30/14* (2006.01)
*B62D 59/04* (2006.01)
*B62D 61/12* (2006.01)
*B60W 50/00* (2006.01)
*B62D 59/02* (2006.01)

(52) U.S. Cl.
CPC ............ *B60W 10/04* (2013.01); *B60W 10/06* (2013.01); *B60W 10/08* (2013.01); *B60W 10/22* (2013.01); *B60W 20/00* (2013.01); *B60W 30/143* (2013.01); *B60W 30/18018* (2013.01); *B60W 30/18109* (2013.01); *B62D 53/0864* (2013.01); *B62D 59/04* (2013.01); *B62D 61/12* (2013.01); *B60W 2050/0054* (2013.01); *B60W 2520/10* (2013.01); *B60W 2520/105* (2013.01); *B60W 2530/10* (2013.01); *B60W 2540/10* (2013.01); *B60W 2540/12* (2013.01); *B60W 2550/142* (2013.01); *B60W 2710/0666* (2013.01); *B60W 2710/09* (2013.01); *B60W 2710/30* (2013.01); *B60W 2720/106* (2013.01); *B62D 59/02* (2013.01)

(58) Field of Classification Search
CPC ......... B60W 30/143; B60W 30/18018; B60W 30/18109; B60W 2050/0054; B60W 2520/10; B60W 2520/105; B60W 2530/10; B60W 2540/10; B60W 2540/12; B60W 2550/142; B60W 2710/0666; B60W 2710/09; B60W 2710/30; B60W 2720/106; B60K 6/12; B60K 6/52; B60K 17/16; B62D 53/0864; B62D 59/04; B62D 61/12; B62D 59/02
USPC .......................................................... 701/93
See application file for complete search history.

(56) References Cited

U.S. PATENT DOCUMENTS

| | | |
|---|---|---|
| 6,119,802 A * | 9/2000 | Puett, Jr. ................ B60K 17/10 180/242 |
| 6,230,829 B1 | 5/2001 | Martin et al. |
| 2003/0062206 A1 | 4/2003 | Fujikawa |
| 2005/0167178 A1 | 8/2005 | Johnson |
| 2011/0197574 A1 * | 8/2011 | Prigent ................ B60K 17/356 60/413 |
| 2013/0118159 A1 | 5/2013 | Schultz et al. |
| 2015/0038286 A1 | 2/2015 | Hane |

FOREIGN PATENT DOCUMENTS

| | | |
|---|---|---|
| EP | 0224144 A1 | 6/1987 |
| EP | 0824416 B1 | 3/2003 |
| EP | 1544018 A2 | 6/2005 |
| WO | 2010098881 A2 | 9/2010 |
| WO | 2012078168 A1 | 6/2012 |
| WO | 2013056723 A1 | 4/2013 |

* cited by examiner

METHOD FOR CONTROLLING A HYDRAULIC HYBRID VEHICLE

BACKGROUND AND SUMMARY

The present invention relates to a method for controlling a hydraulic hybrid vehicle. The invention also relates to a control unit for controlling a hydraulic hybrid vehicle, a hydraulic hybrid vehicle, and a computer program arranged to perform the method steps as defined by the above defined method. The invention is applicable on hydraulic hybrid vehicles, in particularly hydraulic hybrid heavy duty vehicles, such as trucks.

In relation to heavy duty vehicles, i.e relatively large and heavy trucks that are arranged to carry load, either on a container provided on the truck or on one or more trailers connected to the truck, the demand on drivability and vehicle performance is continuously increasing and the vehicles have been steadily developed to meet the various demands from the market. For example, reduction of exhaust gases, reduced fuel consumption, and increased engine performance are some of the criteria that becomes an important aspect when choosing vehicle.

In order to meet the various demands from the market, a plurality of different vehicles are available that are propelled in different ways depending on its specific purpose. For example, there are electric hybrid busses that are propelled electrically as well as by a conventional internal combustion engine. In such cases, the bus is propelled by an electric machine during low vehicle speed, such as e.g. in connection to a bus stop or in a roundabout. These engine concepts are also applicable for other type of vehicles having a plurality of start and stop during operation thereof, such as e.g. refuse collection vehicles. Still further and most recently, heavy vehicles are also provided with pure electric propulsion without a conventional internal combustion engine.

Although examples are given above for various propelling systems for heavy duty vehicles, there is still a desire to further improve the drivability and vehicle performance.

It is desirable to provide a method for controlling a hydraulic hybrid vehicle that has improved drivability and vehicle performance in comparison to the prior art.

According to a first aspect of the present invention, there is provided a method for controlling a hydraulic hybrid vehicle, the hydraulic hybrid vehicle comprising a first pair of wheels and a second pair of wheels; an internal combustion engine connected to the first pair of wheels for propelling the hydraulic hybrid vehicle; and a hydraulic propulsion system comprising a first hydraulic machine connected to the second pair of wheels, wherein the method comprises the steps of receiving a signal indicative of a driving condition, comprising vehicle speed, of the hydraulic hybrid vehicle; comparing the vehicle speed of the driving condition of the hydraulic hybrid vehicle with an upper predetermined threshold speed limit; determining if the vehicle speed of the driving condition is higher than the upper predetermined threshold speed limit; and when the vehicle speed is higher than the upper predetermined threshold speed limit; determining, based on the driving condition, control parameters for operating the first hydraulic machine; and controlling the control parameters of the first hydraulic machine for operating the first hydraulic machine.

The wording "first pair of wheels" and "second pair of wheels" should in the following and throughout the entire description be interpreted as wheels located on each side of the vehicle as seen in the longitudinal direction of the vehicle. For example, the front wheels of die vehicle comprises a pair of wheels where each wheel of the pair of wheels is positioned on a respective left and right side of the vehicle as seen in the longitudinal direction thereof. Also, the vehicle may be provided with more than one wheel on each side of the vehicle, such as two wheels of each side of the vehicle. Furthermore, the first pair of wheels and the second pair of wheels may be connected to a respective first and second wheel axle. The first and/or the second wheel axle may, in some cases, be connected to a differential gear for distribution of torque to the respective wheels.

Furthermore, the wording "vehicle" should be construed as including tractor vehicles (tractor units), i.e towing vehicles, as well as trailer vehicles trailer units), i.e towed vehicles. Also, in the following description, the wording "vehicle" includes the combination of a tractor unit and a trailer unit. Furthermore, the wording "vehicle" can also include a converter dolly arranged between the tractor unit and the trailer unit.

Still further, it should be readily understood that the "upper predetermined threshold speed limit" is a speed limit where the hydraulic hybrid vehicle is driving relatively fast. Hence, the upper predetermined threshold speed limit is not intended to relate to a comparison value for start-stop operations but rather a speed limit of e.g. at least 40 km/h. It is thus only when the vehicle speed of the hydraulic hybrid vehicle is higher than the upper predetermined threshold speed limit that the first hydraulic machine is controlled and operated. The first hydraulic machine, which of course can be two first hydraulic machines positioned on a respective wheel of the second pair of wheels as will be described further below, is thus a high-speed hydraulic machine arranged to be operated when the vehicle speed is above the upper predetermined threshold speed limit. The first hydraulic machine has an operating speed range above vehicle stand still. Hence, the first hydraulic machine has a low torque capacity and a high speed capacity and is therefore not suitable for e.g. start-stop operations.

Moreover, the wording "driving condition" should be construed as a vehicle condition, either a current vehicle condition or an estimated upcoming vehicle condition. For example, and as will be described further below, a driving condition may relate to a requested acceleration from the vehicle operator, an indication of uphill/downhill road inclination, either a current uphill/downhill road inclination or air upcoming estimated uphill/downhill road inclination, etc. Depending on the specific driving condition, the information thereof may be received from a suitable vehicle sensor, GPS, etc.

The "control parameters" should be understood as parameters arranged to control and operate the first hydraulic machine. As will be described further below, the control parameters may control the first hydraulic machine to be operated as either a hydraulic motor or as a hydraulic pump. Also, the control parameters may control how much the first hydraulic machine propels the second pair of wheels when being operated as a motor, or how much hydraulic fluid the first hydraulic machine distributes to other systems when being operated as a hydraulic pump.

Advantages of the present invention are that the hydraulic hybrid vehicle is provided with a first hydraulic machine which, together with the internal combustion engine, can be utilized for higher vehicle speeds. Thus, instead of, or additional to, a start-stop assistance, the first hydraulic machine can be controlled to provide assistance at higher vehicle speed which thus increases the total vehicle speed range for when hydraulic assistance can be provided to the hydraulic hybrid vehicle. Hereby, the drivability and vehicle performance is improved in comparison to the prior art. This may be especially beneficial for vehicles having a relatively high weight, i.e a high so-called gross weight, where minor deviations in e.g. road inclination affects the propulsion of the vehicle by only using the internal combustion engine. Further examples will be given below in relation to the detailed example embodiments of the present invention.

According to an example embodiment, the method may comprise the step of controlling the control parameters of the first hydraulic machine for operating the first hydraulic machine as a motor by adding propulsion torque from the first hydraulic machine to the second pair of wheels.

Hereby, a propulsion boost can be added to the propulsion from the internal combustion engine. Accordingly, the drivability of the hydraulic hybrid vehicle is increased since the first hydraulic machine can supply propulsion to the vehicle if the propulsion from the internal combustion engine is insufficient for e.g. holding a certain desired vehicle speed. Also, vehicle performance is improved in terms of reduced fuel consumption since the addition of propulsion from the first hydraulic machine enables for a reduction of the propulsion from the internal combustion engine, thus reducing fuel consumption. Accordingly, it is possible to maintain total used power at a constant level by reducing the performance of the internal combustion engine and add propulsion from the first hydraulic machine, or to increase performance by keeping the performance from the internal combustion engine and at the same time add propulsion from the first hydraulic machine. As a further advantage, the gradeability, i.e the steepness of grade that the vehicle is capable of climbing at efficient speed, is improved.

According to an example embodiment, the driving condition may comprise an indication of an undesired reduction of vehicle speed, the method comprising the steps of comparing the undesired reduction of vehicle speed with a predetermined speed reduction threshold rate; determining if the undesired reduction of vehicle speed reduces faster than the predetermined speed reduction threshold rate; and when the vehicle speed reduces faster than the predetermined speed reduction threshold rate; controlling the control parameters of the first hydraulic machine for operating the first hydraulic machine as a motor by adding propulsion torque from the first hydraulic machine to the second pair of wheels.

The wording "undesired reduction of vehicle speed" should be construed such that the speed of the vehicle is reducing without the vehicle operator actively indicating that such a reduction is desired. For example, the vehicle speed is reducing even if speed is set by a cruise controller of the vehicle, or if the vehicle speed is reducing when the accelerator pedal is kept in a fixed position. Such a situation can occur when the vehicle is driving at an upwardly sloping hill, or in case of a sudden increased headwind. An undesired reduction of vehicle speed can hence be detected by receiving an indication that the vehicle speed is reducing while at the same time the accelerator pedal is kept in approximately the same position as prior to the reduction of vehicle speed, or a signal indicative of a desired set speed from cruise control is given, which set speed can not be kept.

An advantage is thus that the vehicle speed can be kept at the desired speed level in cases where the propulsion from the internal combustion engine is insufficient. This may be especially beneficial for larger vehicles with heavy loading where minor uphill gradients can cause the vehicle speed to be undesirably reduced. Hereby, the vehicle performance is improved.

According to an example embodiment, the driving condition may comprise an indication of an inclination of a road gradient of the hydraulic hybrid vehicle, the method comprising the steps of: comparing the inclination of the road gradient with a predetermined inclination threshold limit; determining if the inclination of the road gradient is larger than the predetermined inclination threshold limit; and when the inclination of the road gradient is larger than the predetermined inclination threshold limit; controlling the control parameters of the first hydraulic machine for operating the first hydraulic machine as a motor by adding propulsion torque from the first hydraulic machine to the second pair of wheels.

As described above, an advantage is thus that the hydraulic hybrid vehicle can be provided with a propulsion boost when driving uphill such that a desired vehicle speed can be kept. Further, the road gradient can either be the current road gradient for the vehicle or an upcoming estimated road gradient which can be detected by e.g. a GPS or the like. An advantage of receiving an indication of an upcoming road gradient for the vehicle is that the first hydraulic machine can be prepared and arranged to supply propulsion torque before the vehicle arrives at the upward slope of the road.

Further, it should be readily understood that different predetermined inclination threshold limits can be set depending on the specific vehicle. For example, a larger and heavier vehicle can be allowed to add propulsion torque horn the first hydraulic machine at a less steep inclination in comparison to a smaller and less heavy vehicle. Also, the predetermined inclination threshold limits can be set by measuring/detecting the loading of the vehicle, where a loaded vehicle can be allowed to add propulsion torque from the first hydraulic machine at a less steep inclination in comparison to an unloaded vehicle.

According to an example embodiment, the driving condition may comprise an indication of a change in accelerator pedal position, the method comprising the steps of measuring an acceleration of the vehicle in response to the change in accelerator pedal position; comparing the measured acceleration of the vehicle with a predetermined vehicle acceleration threshold limit; determining if the measured acceleration is lower than'the predetermined vehicle acceleration threshold limit; and when the measured acceleration is lower than the predetermined vehicle acceleration threshold limit; controlling the control parameters of the first hydraulic machine for operating the first hydraulic machine as a motor by adding propulsion torque from the first hydraulic machine to the second pair of wheels.

Hereby, if the vehicle operator desires a propulsion boost, the first hydraulic machine is controlled to add propulsion torque to the second pair of wheels. Such situation may occur if the vehicle initiates an overtaking of another vehicle or if the acceptable speed limit increases and there is a desire to rapidly accelerate the vehicle to the new speed limit. An advantage is thus that the hydraulic hybrid vehicle will be accelerated to the desired vehicle speed faster in comparison to only accelerate the vehicle by using the internal combustion engine. This will also reduce the fuel consumption since the acceleration period, which is associated with increased fuel consumption, is reduced.

According to an example embodiment, the hydraulic hybrid vehicle may comprise a liftable wheel axle, the second pair of wheels being connected to the liftable wheel axle, wherein the driving condition comprises an indication of a wheel axle load pressure of the liftable wheel axle, the method comprising the steps of comparing the wheel axle load pressure of the liftable wheel axle with a maximum allowable load pressure threshold limit; determining if the wheel axle load pressure of the liftable wheel axle is lower than the maximum allowable load pressure threshold limit; and when the wheel axle load pressure of the liftable wheel axle is lower than the maximum allowable load pressure threshold limit; controlling the liftable wheel axle to be positioned in a state where the second pair of wheels are in no contact with the ground surface.

An advantage is that when there is no desire to use the first hydraulic machine and the load condition of the wheel axles are beneficial, the mechanical resistance from the first hydraulic machine is reduced which thus enables for an "on-demand" addition of the first hydraulic machine. Thus, in comparison to not being able to lift the wheels connected to the first hydraulic machine, a total reduction of Mel consumption is provided for the present embodiment of the present invention.

According to an example embodiment, the hydraulic propulsion system may comprise a hydraulic accumulator in fluid communication with the first hydraulic machine.

Hereby, a buffer tank with high pressure hydraulic fluid is provided for the first hydraulic machine such that high pressure hydraulic fluid can be supplied to the first hydraulic machine in a more rapid manner in comparison to receiving hydraulic fluid form e.g. a hydraulic tank of the vehicle or the like. The hydraulic accumulator can of course also be arranged in fluid communication with the second hydraulic machine as is described below.

According to an example embodiment, the method may comprise the step of controlling the control parameters of the first hydraulic machine for operating the first hydraulic machine as a hydraulic pump by supplying hydraulic fluid from the first hydraulic machine to the hydraulic accumulator.

An advantage is thus that the first hydraulic machine can be operated as a pump which increases the energy efficiency of the system. The first hydraulic machine thus supplies high pressure hydraulic fluid to the hydraulic accumulator for use at a later stage when there is a desire to operate the first hydraulic machine as a hydraulic motor.

According to an example embodiment, the driving condition may comprise an indication of an inclination of a downhill slope of the vehicle, the method comprising the steps of comparing the inclination of the downhill slope with a predetermined minimum threshold inclination limit; determining if the inclination of the downhill slope is higher than the predetermined minimum threshold inclination limit; and when the inclination of the downhill slope is higher than the predetermined minimum threshold inclination limit; controlling the control parameters of the first hydraulic machine for operating the first hydraulic machine as a pump for supplying hydraulic fluid to the hydraulic accumulator.

In a downhill slope there is often no desire to add propulsion torque to the vehicle and it is thus beneficial to control the hydraulic machine to operate as a pump to supply high pressure hydraulic fluid to the hydraulic accumulator.

According to an example embodiment, the driving condition may comprise an indication of an amount of hydraulic fluid being present in the hydraulic accumulator; the method comprising the steps of comparing the amount of hydraulic fluid present in the hydraulic accumulator with a predetermined threshold limit; determining if the amount of hydraulic fluid in the hydraulic accumulator is larger than the predetermined threshold limit; and when the amount of hydraulic fluid in the hydraulic accumulator is larger than the predetermined threshold limit; controlling the internal combustion engine to reduce propulsion torque to the first pair of wheels using control parameters of the internal combustion engine; and controlling the control parameters of the first hydraulic machine for operating the first hydraulic machine as a motor by adding propulsion torque from the first hydraulic machine to said second pair of wheels.

An advantage is that the first hydraulic machine is controlled to operate as a hydraulic motor if there is a sufficient amount of hydraulic fluid in the accumulator to do so. This is also beneficial in a fuel consumption point of view since the propulsion from the internal combustion engine can be reduced if there is a possibility to add propulsion from the first hydraulic machine. The method is thus also suitable to use when driving on a relatively flat road surface. It is also possible to allow the hydraulic accumulator to completely run out of hydraulic fluid if an indication from e.g. a GPS or the like determines that there is a downhill slope further ahead where the first hydraulic machine can be operated as a pump that supplies and fills hydraulic fluid to the hydraulic accumulator.

According to an example embodiment, the hydraulic hybrid vehicle may further comprise a third pair of wheels and a second hydraulic machine connected to the third pair of wheels, wherein the method comprises the steps of comparing the vehicle speed of the driving condition of said hydraulic hybrid vehicle with a lower predetermined threshold speed limit; determining if the vehicle speed of the driving condition is lower than the lower predetermined threshold speed limit; and when the vehicle speed is lower than the lower predetermined threshold speed limit; determining, based on the driving condition, control parameters for operation the second hydraulic machine; and controlling the control parameters of the second hydraulic machine for operating the second hydraulic machine as a motor by adding propulsion torque from the second hydraulic machine to said third pair of wheels.

The second hydraulic machine is thus arranged to add propulsion during lower vehicle speeds. Hereby, the hydraulic hybrid vehicle can be provided with propulsion boost from hydraulic motors for an increased vehicle speed range. For example, the second hydraulic machine can add propulsion torque to the hydraulic hybrid vehicle for a speed range between e.g. 0-40 km/h and the first hydraulic machine can add propulsion torque to the hydraulic hybrid vehicle for a speed range between e.g. 40-90 km/h. It should be noted that the ranges are merely exemplary and that the example is made for illustrating that the first hydraulic machine is arranged to operate at a higher speed range in comparison the speed range of which the second hydraulic machine is arranged to operate. Hereby, the second hydraulic machine can add propulsion torque to the vehicle up to, for example, 40 km/h, which may reduce the fuel consumption since the internal combustion engine can be propelled to a lesser degree. It should also be understood that the control parameters of the second hydraulic machine may be controlled for operating the second machine as a hydraulic pump, i.e to conduct generative braking from speeds of e.g. 40 km/h to approximately stand-still.

According to a second aspect of the present invention, there is provided a control unit for controlling a hydraulic hybrid vehicle, said hydraulic hybrid vehicle comprising a first pair of wheels and a second pair of wheels; an internal combustion engine connected to said first pair of wheels for propelling said hydraulic hybrid vehicle; and a hydraulic propulsion system comprising a first hydraulic machine connected to the second pair of wheels, wherein the control unit is configured to receive a signal indicative of a driving condition, comprising vehicle speed, of said hydraulic hybrid vehicle; compare the vehicle speed of the driving condition of said hydraulic hybrid vehicle with an upper predetermined threshold speed limit; determine if the vehicle speed of the driving condition is higher than the upper predetermined threshold speed limit; and when the vehicle speed is higher than the upper predetermined threshold speed limit; determine, based on the driving condition, control parameters for operating the first hydraulic machine; and control the control parameters of the first hydraulic machine for operating the first hydraulic machine.

Effects and features of this second aspect are largely analogous to those described above in relation to the first aspect of the present invention.

According to a third aspect of the present invention, there is provided a hydraulic hybrid vehicle comprising: a first pair of wheels and a second pair of wheels; an internal combustion engine connected to said first pair of wheels and arranged for propelling the hydraulic hybrid vehicle; and a hydraulic propulsion system comprising a first hydraulic machine connected to the second pair of wheels; wherein the hydraulic hybrid vehicle comprises a control unit configured to receive a signal indicative of a driving condition, including vehicle speed, of said hydraulic hybrid vehicle; compare the vehicle speed of the driving condition of said hydraulic hybrid vehicle with an upper predetermined threshold speed limit; determine if the vehicle speed of the driving condition is higher than the upper predetermined threshold speed limit; and when the vehicle speed is higher that the upper predetermined threshold speed limit; determine, based on the driving condition, control parameters for operating the first hydraulic machine; and control the control parameters of the first hydraulic machine for operating the first hydraulic machine.

According to an example embodiment, the hydraulic hybrid vehicle may comprise a liftable wheel axle, wherein the second pair of wheels is connected to the liftable wheel axle.

According to an example embodiment, the hydraulic hybrid vehicle may further comprise a third pair of wheels and a second hydraulic machine connected to the third pair of wheels.

According to an example embodiment, each wheels of the first pair of wheels may comprise an individual first hydraulic machine. Hereby, the packing arrangement of the vehicle is improved since the hydraulic machine does not have to be incorporated into the relatively tight area of the vehicle driveline.

According to an example embodiment, the first hydraulic machine may be connected to a differential gearing arrangement for distribution of torque from the first hydraulic machine to each of the wheels of the first pair of wheels. An advantage is that a single hydraulic machine can be provided for both of the wheels of the pair of wheels.

According to an example embodiment, the hydraulic propulsion system may comprise a transmission arrangement, said transmission arrangement being connected downstream the first hydraulic machine and upstream the first pair of wheels.

Hereby, the speed range for which the first hydraulic machine can be operated as a hydraulic motor or as a hydraulic pump is increased. The transmission arrangement can be an automatic transmission arrangement or a manual transmission arrangement. An advantage is that the operating range for the first hydraulic machine can be improved, i.e extended to a larger speed range.

According to an example embodiment, the hydraulic propulsion system may comprise a hydraulic accumulator in fluid communication with the first hydraulic machine.

According to an example embodiment, the hydraulic propulsion system may comprise a hydraulic pump in fluid communication with said hydraulic accumulator. The hydraulic pump can preferably be used for charging the hydraulic accumulator.

According to an example embodiment, the hydraulic pump may be connected to the internal combustion engine of the hydraulic hybrid vehicle.

According to an example embodiment, the hydraulic pump may be electrically connected to an electric power system of the hydraulic hybrid vehicle. Hereby, a so-called dynamo charging of the hydraulic accumulator is possible, without the need of propelling the vehicle. Hence, the hydraulic accumulator can be charged with hydraulic fluid without propelling the vehicle. The electricity may be provided to the electrically hydraulic pump by use of cables or standard connections in e.g. the trailer unit.

According to an example embodiment, the hydraulic hybrid vehicle may further comprise a converter dolly positioned between a tractor unit and a trailer unit of the hydraulic hybrid vehicle.

According to an example embodiment, the second pair of wheels may be connected to the converter dolly. According to an example embodiment, the third pair-of wheels may be connected to the converter dolly.

An advantage is that the propulsion possibilities are provided to other parts of the vehicle, which may be beneficial for vehicle combinations comprising e.g. trailers since the hydraulic propulsion can be provided to wheels positioned further rearwards in comparison to the rearmost wheels of the tractor unit. Further, more axle load is hereby available to the driven wheels of the vehicle which is beneficial in cases where the propulsion needs to be distributed to several wheel axles of the vehicle, such as on low friction areas, etc. Positioning the first hydraulic machine in connection to the convener dolly has the further advantage that it will only be used in cases where the converter dolly is used and the vehicle is provided with a relatively heavy loading.

Furthermore, positioning the hydraulic machines on the converter dolly can also improve the maneuverability during low speeds in case the converter dolly is individually steered, or to improve the stability during reversing of the vehicle, since propulsion is added to wheels located rearwardly of the tractor unit wheels.

A further advantage is that the electrically controlled hydraulic pump can be positioned on the convener dolly. Hereby, the converter dolly can be propelled without being connected to the tractor unit. This can be especially beneficial in loading/unloading areas for docking the converter dolly to the trailer and/or tractor unit.

Further effects and features of the third aspect of the present invention are largely analogous to those described above in relation to the first and second aspects of the present invention.

According to a fourth aspect of the present invention, there is provided a computer program comprising program code means for performing any of the steps defined above in relation to the first aspect of the present invention when said program is run on a computer.

According to a fifth aspect of the present invention, there is provided a computer readable medium carrying a computer program comprising program code means for performing any of the steps defined above in relation to the first aspect of the present invention when said program is run on a computer.

Further effects and features of the fourth and fifth aspects of the present invention are largely analogous to those described above in relation to the first, second and third aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAIL DESCRIPTION

Figure 1:
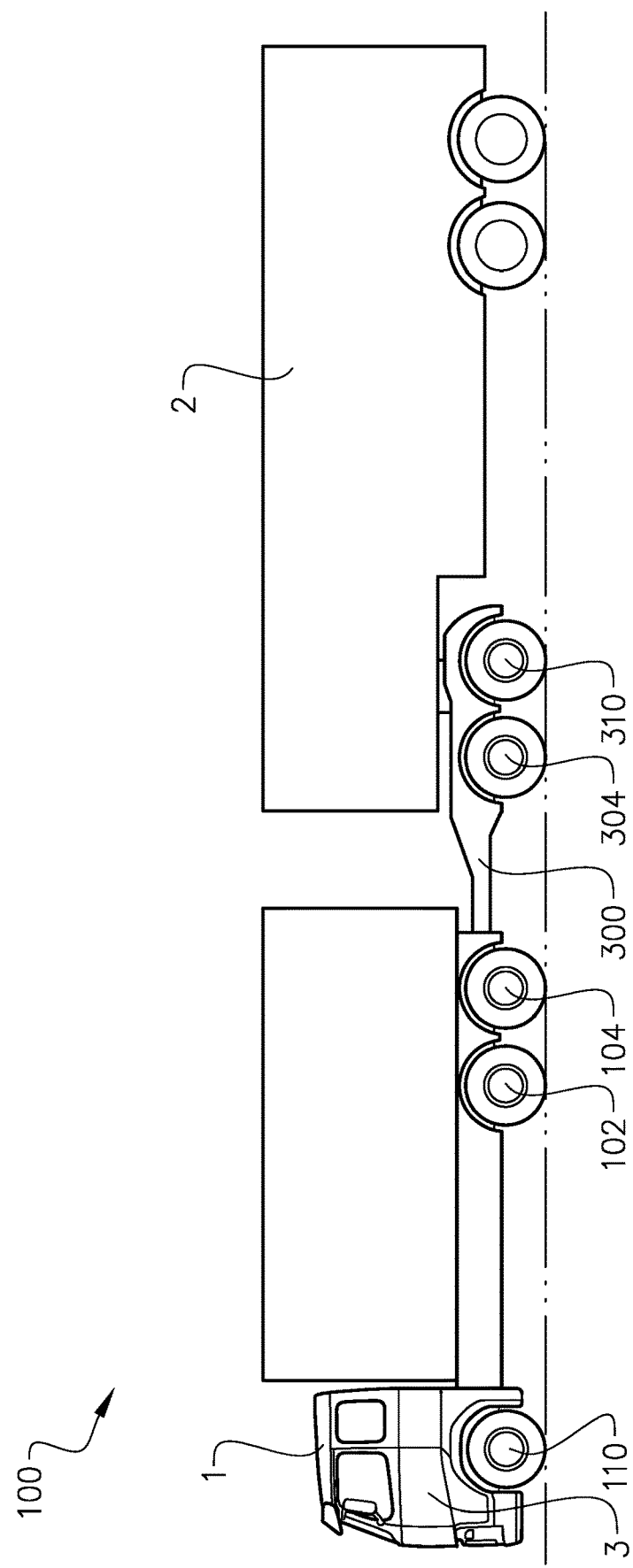
FIG. 1 is a lateral side view illustrating an example embodiment of a hydraulic hybrid vehicle in the form of truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a hydraulic hybrid vehicle 100 having a tractor unit 1, which is a towing vehicle unit, and a trailer unit 2, which is a towed vehicle unit. The tractor unit 1 comprises a cabin 3 for e.g. operation of the hydraulic hybrid vehicle. Furthermore, the hydraulic hybrid vehicle 100 depicted in FIG. 1 comprises a converter dolly 300 arranged between the tractor unit 1 and the trailer unit 2. Still further, the tractor unit of the hydraulic hybrid vehicle 100 comprises a front pair of wheels 110 and two rear pair of wheels 102, 104. In the following and throughout the description, the front pair of wheels will be denoted as the second pair of wheels, the foremost pair of wheels of the two rear pair of wheels will be denoted as the first pair of wheels 102, and the rearmost pair of wheels of the two rear pair of wheels will be denoted as the third pair of wheels 104.

Figure 2:
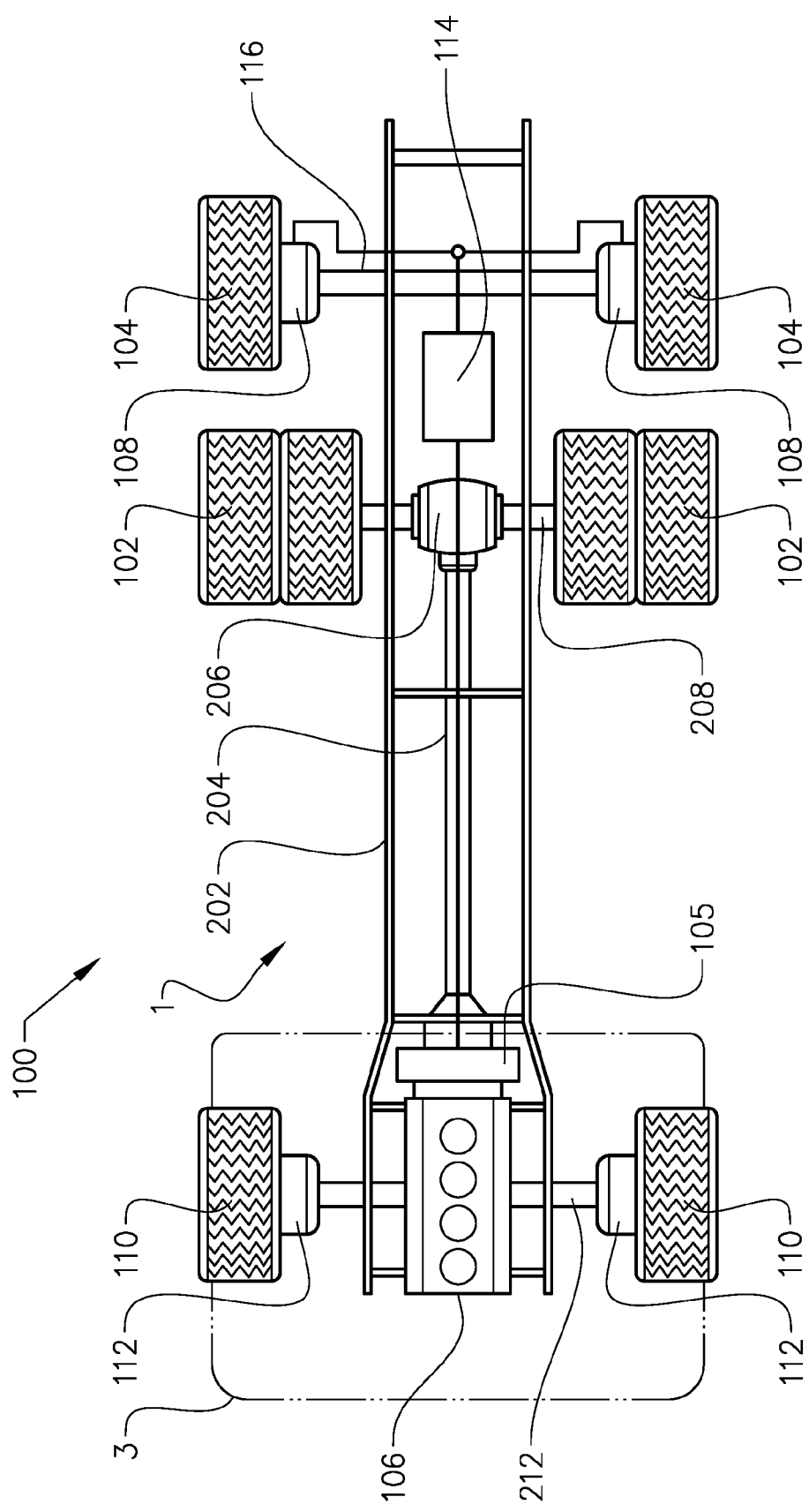
FIG. 2 illustrates in detail an example embodiment of the internal combustion engine and the hydraulic propulsion system of the hydraulic hybrid vehicle in FIG. 1.

Turning to FIG. 2, which in further detail illustrates components arranged on the tractor unit 1 of the hydraulic hybrid vehicle 100. More particularly, as is illustrated in FIG. 2, the hydraulic hybrid vehicle 100 comprises a frame 202 on to which an internal combustion engine 106 is connected. The internal combustion engine 106 may be a diesel engine or petrol engine. Other alternative combustion engines are of course also conceivable, such an internal combustion engine propelled by ethanol or gas, etc. Furthermore, the internal combustion engine 106 is connected to a drive shaft 204 of the hydraulic hybrid vehicle 100. The internal combustion engine 106 may be connected to the drive shaft 204 via a vehicle transmission of suitable kind. Still further, the internal combustion engine 106 is connected to a first pair of wheels 102, in the illustrated example embodiment depicted in FIG. 2 via the drive shaft 204 and a differential gearing arrangement 206. Hereby, torque supplied from the internal combustion engine 106 is transmitted to the first pair of wheels 102 and it should hence be readily understood that the first pair of wheels 102 are driven wheels of the vehicle. Still further, a first wheel axle 208 of the hydraulic hybrid vehicle 100 connects the first pair of wheels 102 to the differential gearing arrangement 206.

It should thus be readily understood from the present disclosure that the internal combustion engine 106 is the primary power source of the hydraulic hybrid vehicle 100. Hence, the hydraulic hybrid vehicle 100 is primarily propelled by the internal combustion engine 106.

Furthermore, the hydraulic hybrid vehicle 100 comprises a second pair of wheels 104. In the illustrated example embodiment of FIG. 2, the second pair of wheels 104 is positioned as the rearmost pair of wheels of the tractor unit 1. Further, the second pair of wheels is connected to a second wheel axle. The second wheel axle may be arranged as a liftable wheel axle 116. The liftable wheel axle 116 may be lifted such that the second pair of wheels is positioned above ground and in no contact with the ground surface. The liftable wheel axle 116 may be lifted on a demand from the vehicle operator or at times when the wheel axle loading condition permits such redistribution of wheel axle load to the remaining wheel axles of the vehicle. Further, the liftable wheel axle may be lifted by means of controlling air pressure in air bellows (not shown) of the wheel axle suspension. However, details concerning the lifting procedure will not be given in the following of this application.

Moreover, in the example embodiment depicted in FIG. 2, each of the wheels of the second pair of wheels 104 are connected to a first hydraulic machine 108. The first hydraulic machine 108 is thus arranged to propel the second pair of wheels 104. Although FIG. 2 depicts that each wheel comprises an individual first hydraulic machine 108, it should be readily understood that the second pair of wheels 104 may be connected to a single first hydraulic machine which propels the second pair of wheels 104. Such single first hydraulic machine may be connected directly to the liftable wheel axle 116 or connected thereto via e.g. a differential gearing arrangement (not shown).

The first hydraulic machine 108 is a high-speed hydraulic machine which means that it is only configured to operate at relatively high vehicle speeds. Hence, the first hydraulic machine 108 has an operating speed range which is in the cruising speed range of the hydraulic hybrid vehicle 100. As a non-limiting example, the first hydraulic machine 108 may have an operating speed range between 40 km/h-90 km/h. As an example, the first hydraulic machine 108 may be a radial hydraulic engine which comprise fewer pistons in comparison to a low-speed hydraulic machine such that the speed can be increased for a specific and constant power level.

Furthermore, the first hydraulic machine 108 is arranged in fluid communication with a hydraulic accumulator 114 of the hydraulic hybrid vehicle 100. The hydraulic accumulator 114 is arranged as a buffer tank for high pressure hydraulic fluid. Still further, the hydraulic accumulator 114 is also arranged in fluid communication with a hydraulic pump 105. In FIG. 2, the hydraulic pump 105 is a mechanical hydraulic pump connected and controlled by the internal combustion engine 106. However, the hydraulic pump 105 may instead be an electrical hydraulic pump connected to e.g. an electrical power system of the hydraulic hybrid vehicle 100. The hydraulic pump 105 hence supplies high pressure hydraulic fluid to the hydraulic accumulator 114 which stores the high pressure hydraulic fluid until providing it to the first hydraulic machine 108.

It should be readily understood that the first hydraulic machine 108 may be operated as a hydraulic motor for propelling the second pair of wheels 104, or be operated as a hydraulic pump to supply hydraulic fluid to the hydraulic accumulator 114. Hence, the hydraulic accumulator 114 may thus receive high pressure, hydraulic fluid from the hydraulic pump 105 as well as from the first hydraulic machine 108, in those cases when the first hydraulic machine is controlled to operate as a hydraulic pump. Further details with regards to how the first hydraulic machine is operated will be given below in relation to FIG. 4.

Moreover, the hydraulic hybrid vehicle 100 comprises a third pair of wheels 110. In the illustrated example embodiment of FIG. 2, the third pair of wheels 110 is positioned as the foremost pair of wheels of the tractor unit 1. The third pair of wheels 110 are hence the steerable wheels located under the cabin 3 of the hydraulic hybrid vehicle 100. The third pair of Wheels 110 is connected to a third wheel axle 212.

Furthermore, each of the wheels of the third pair of wheels is connected to a second hydraulic machine 112. The second hydraulic machine 112 is thus arranged to propel the third pair of wheels 110. Although FIG. 2 depicts that each wheel comprises an individual second hydraulic machine 112, it should be readily understood that the third pair of wheels 110 may be connected to a single second hydraulic machine which propels the third pair of wheels 110. Such single second hydraulic machine may be connected directly to the third wheel axle 212 or connected thereto via e.g. a differential gearing arrangement (not shown).

The second hydraulic machine 112 is a low-speed hydraulic machine which means that it is only configured to operate at relatively low vehicle speeds. Hence, the second hydraulic machine 112 has an operating speed range which corresponds to start-stop operations of the vehicle and vehicle speeds where the vehicle is in an accelerating phase or driving in city environments, etc. As a non-limiting example, the second hydraulic machine 112 may have an operating speed range between 0 km/h-40 km/h. The second hydraulic machine 112 can improve the gradeability on steeper slopes and improve the traction on low friction surfaces, etc.

It should hence be understood from the present description that the first hydraulic machine 108 is configured to operate at a speed range which is faster than the speed range of the second hydraulic machine 112. The first hydraulic machine 108 has a lower torque capacity in comparison to the second hydraulic machine 112 but has on the other hand a higher speed capacity in comparison to the second hydraulic machine 112.

Although not clearly depicted in FIG. 2, the second hydraulic machine 112 can also be arranged in fluid communication with the hydraulic accumulator 114 and/or the hydraulic pump 105.

It should be readily understood that the second hydraulic machine 112 may be operated as a hydraulic motor for propelling the third pair of wheels 110, or be operated as a pump to supply hydraulic fluid to the hydraulic accumulator 114. Hence, the hydraulic accumulator 114 may thus receive high pressure hydraulic fluid also from the second hydraulic machine 108, in those cases when the second hydraulic machine 112 is controlled to operate as a pump. Further details with regards to how the second hydraulic machine is operated will be given below in relation to FIG. 4.

Figure 3:
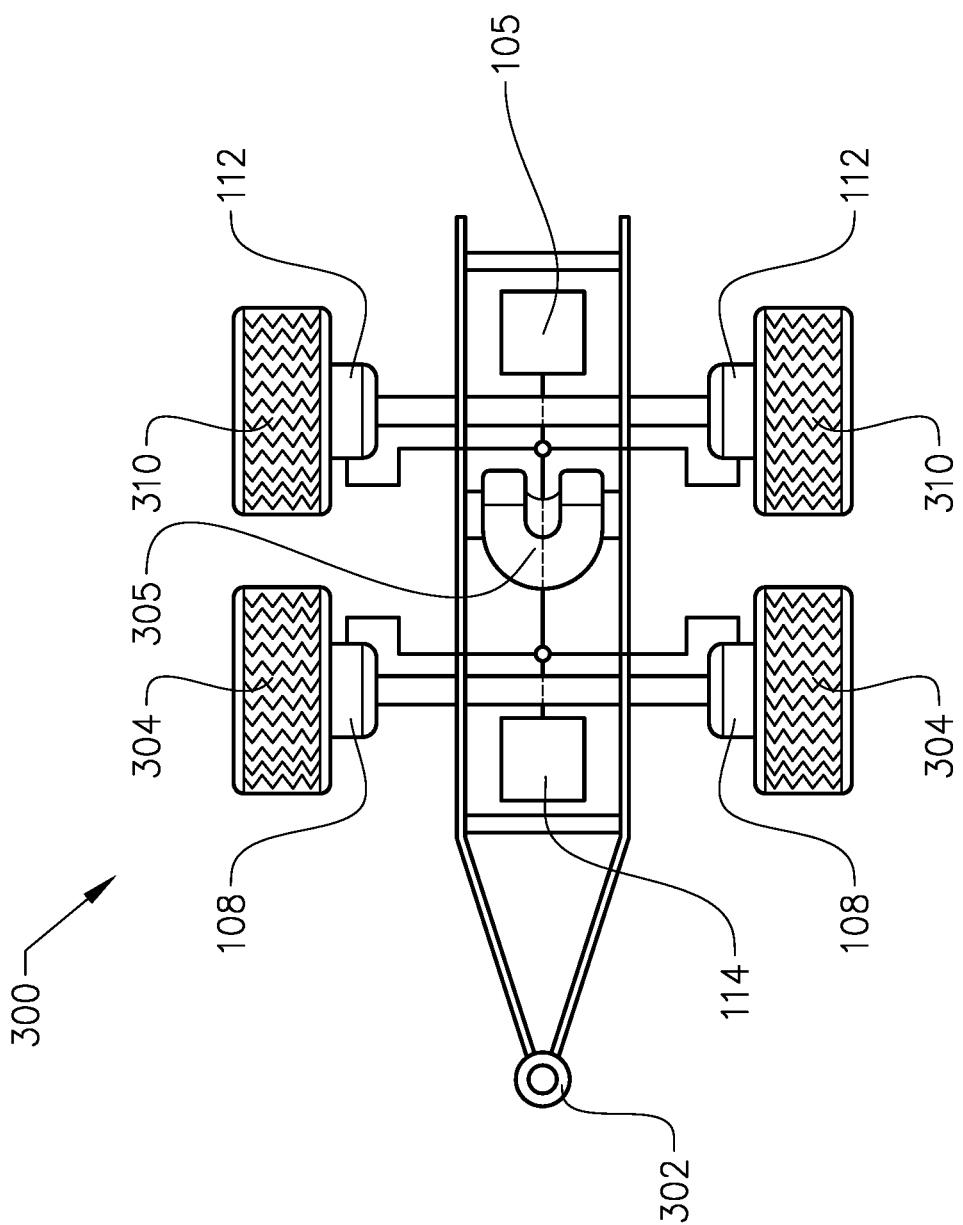
FIG. 3 illustrates an example embodiment of the hydraulic propulsion system arranged on a converter dolly according to the present invention.

Now, with particular reference to FIG. 3, there is illustrated a converter dolly (or dolly trailer) 300 to which the first 108 and second 112 hydraulic machines can be positioned according to an example embodiment of the present invention. The converter dolly 300 is arranged to be positioned between the tractor unit 1 and the trailer unit 2 of the hydraulic hybrid vehicle 100. More particularly, the convener dolly is connected to the tractor unit 1 via a front coupling arrangement 302 and connected to the trailer unit 2 via a so-called fifth wheel 305 of the dolly converter 300. The front coupling arrangement 302 does not necessarily have to be connected to the tractor unit 1 but can also be used for connection to another trailer unit 2 in case of a hydraulic hybrid vehicle 100 provided with a plurality of trailer units.

As can be seen in FIG. 3, the dolly convener 300 is provided with a sec d pair of wheels 304 which is connected to the first hydraulic machine 108, and a third pair of wheels 310 which is connected to the second hydraulic machine 112. The internal combustion engine 106 thus propels the first pair of wheels which is positioned on the tractor unit 1 of the hydraulic hybrid vehicle 100.

The dolly converter 300 depicted in FIG. 3 also comprises a hydraulic accumulator 114 which is arranged in fluid communication with the first 108 and the second 112 hydraulic machines and which functions as described above in relation to FIG. 2. The dolly converter also comprises a hydraulic pump 105 which is arranged in fluid communication with the hydraulic accumulator 114. The hydraulic pump 105 may also be in direct fluid communication with the first 108 and the second 112 hydraulic machines. Furthermore, the hydraulic pump 105 depicted in FIG. 3 is an electric hydraulic pump which is electrically connected to the electric power system of the hydraulic hybrid vehicle. Still further, the hydraulic accumulator can be charged by means of so-called dynamo charging during propulsion of the internal combustion engine.

Accordingly, as depicted by the example embodiment in FIG. 3, the first 108 and second 112 hydraulic machines may be arranged on a converter dolly 300 as an alternative to positioning the first 108 and second 112 hydraulic machines on the tractor unit of the hydraulic hybrid vehicle 100.

Figure 4:
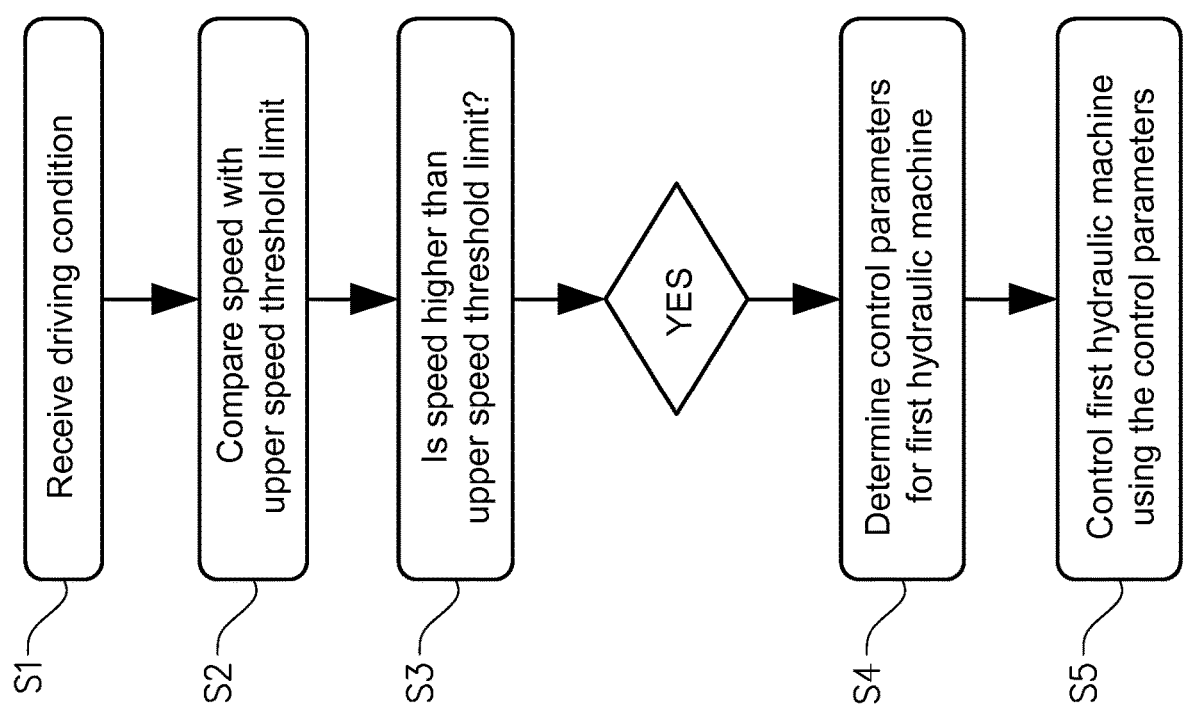
FIG. 4 is a flow chart of a method for controlling a hydraulic hybrid vehicle according to an example embodiment of the present invention.

Now, in order to describe the implementation of the hydraulic machines 108, 112 of the hydraulic hybrid vehicle 100, reference is made to FIG. 4 which depicts a flow chart of a method for controlling a hydraulic hybrid vehicle according to an example embodiment of the present invention.

When driving the hydraulic hybrid vehicle 100, with primary propulsion from the internal combustion engine 106, a signal is received S1, which signal is indicative of a driving condition of the hydraulic hybrid vehicle. The driving condition comprises at least an indication of the vehicle speed of the hydraulic hybrid vehicle 100. The driving condition may also comprise further information relating to vehicle condition or vehicle operating condition. For example, the signal may contain information relating to vehicle speed and how it is increased/reduced over a predetermined time period and if the increase/reduction of vehicle speed is a result of a change in accelerator pedal position or not. Hence, the driving condition may contain information relating to a change in accelerator pedal position over time, which is an indication whether there is a desire to increase/reduce vehicle speed. The brake pedal positon other sensors for determining if the brake is, or is intended to be, applied can also constitute a driving condition. As a further example, the road inclination can also constitute a driving condition. Such road inclination can be the present road inclination for the vehicle or an estimated/calculated upcoming road inclination that is located at a certain distance ahead of the vehicle.

The vehicle speed of the hydraulic hybrid vehicle 100 is thereafter compared S2 to an upper predetermined threshold speed limit. It is thereafter determined S3 if the vehicle speed of the hydraulic hybrid vehicle 100 is higher than the upper predetermined threshold speed limit. Hereby, it is determined if the vehicle is running at speeds corresponding to the operating speed of the first hydraulic machine 108. As described above, the first hydraulic machine 108 is a high-speed hydraulic machine. Therefore, the vehicle speed of the hydraulic hybrid vehicle 100 must be higher than the upper predetermined threshold speed limit in order to be able to operate the first hydraulic machine 108. Preferably, the upper predetermined threshold speed limit corresponds to the lower speed limit of the operating speed range for the first hydraulic machine 108.

When it is determined that the vehicle speed is higher than the upper predetermined threshold speed limit, control parameters for operating the first hydraulic machine 108 is determined S4 based on the above described driving conditions. Thereafter, the control parameters are controlled S5 for operating the first hydraulic machine.

Hereby, the first hydraulic machine 108 is controlled based on the current, or upcoming, vehicle condition. For example, if it is determined that the vehicle is in need of an increased acceleration boost, the control parameters control the first hydraulic machine 108 to be operated as a hydraulic motor to add propulsion to the second pair of wheels 104. Hereby, the internal combustion engine 106, together with the first hydraulic machine 108 will add propulsion to the hydraulic hybrid vehicle 100 for increasing the acceleration thereof.

On the other hand, if it is determined that there is a desire to propel the vehicle eco friendly, the control parameters may control the first hydraulic machine to be operated as a hydraulic motor while at the same time control parameters of the internal combustion engine reduces the propulsion from the internal combustion engine. Hereby, the hydraulic hybrid vehicle will have a reduced fuel consumption while still being propelled in approximately the same speed as before.

Hence, in terms of utilizing the first hydraulic machine 108 as a hydraulic motor, the first hydraulic machine can either increase the capacity of the hydraulic hybrid vehicle 100, i.e provide additional propulsion boost to increase the vehicle speed, or reduce the fuel consumption of the hydraulic hybrid vehicle 100 by reducing propulsion from the internal combustion engine 106, and to keep vehicle speed at a substantially constant cruising speed.

Furthermore, the driving condition may also contain information relating to a downhill slope of the hydraulic hybrid vehicle. Hereby, the control parameters of the first hydraulic machine 108 may control the first hydraulic machine 108 to be operated as a hydraulic pump which supplies high pressure hydraulic fluid to the hydraulic accumulator 114.

The high pressure hydraulic fluid provided in the hydraulic accumulator 114 can thereafter be used for propelling the first hydraulic machine 108 when being controlled to be operated as a hydraulic motor. The high pressure hydraulic fluid may also be used for propelling the second hydraulic machine 112 when being controlled to be operated as a hydraulic motor. In the latter case, the high pressure hydraulic fluid in the hydraulic accumulator 114 can be supplied to the second hydraulic machine 112 during e.g. start-up of the hydraulic hybrid vehicle 100.

The vehicle speed of the hydraulic hybrid vehicle 100 can also be compared to a lower predetermined threshold speed limit. When the vehicle speed of the hydraulic hybrid vehicle 100 is lower than the lower predetermined threshold speed limit, control parameters of the second hydraulic machine 112 is determined based on the driving condition. Thereafter, the control parameters of the second hydraulic machine 112 are controlled for operating the second hydraulic machine 112. Hence, if the vehicle is driving at a speed which is lower than the lower predetermined threshold speed limit, which is within the operating speed range of the second hydraulic machine 112, the control parameters of the second hydraulic machine 112 can be utilized to control the second hydraulic machine 112.

Hereby, if the vehicle is driving relatively slow and is intended to brake, the control parameters of the second hydraulic machine 112 can control the second hydraulic machine 112 to be operated as a hydraulic pump to further reduce vehicle speed and provide high pressure hydraulic fluid to the hydraulic accumulator 114. The control parameters of the second hydraulic machine 112 may also control the second hydraulic machine 112 to be operated as a hydraulic motor by adding propulsion torque from the second hydraulic machine to said third pair of wheels. The latter may be beneficial in start-up situations or when the vehicle is operated at a relatively steep uphill slope and driving in a slow speed.

It is to be understood that the present invention is not limited to the embodiments described above and illustrated in the drawings; rather, the skilled person will recognize that many changes and modifications may be made within the scope of the appended claims. For example, some details have been given relating to different driving conditions of the vehicle and it should be appreciated that other alternatives are also conceivable. Further, the invention should not be construed as limited to the number of hydraulic machines depicted in FIGS. 1-3, further hydraulic machines connected to further wheels or wheel axles are also conceivable and within the scope of the present invention.

The invention claimed is:

1. A method for controlling a hydraulic hybrid vehicle, the hydraulic hybrid vehicle comprising:
   a first pair of wheels, a second pair of wheels and a third pair of wheels;
   an internal combustion engine connected to the first pair of wheels for propelling the hydraulic hybrid vehicle; and
   a hydraulic propulsion system comprising a first hydraulic machine connected to the second pair of wheels, and a second hydraulic machine connected to the third pair of wheels, wherein the method comprises the steps of:
   receiving a signal indicative of a driving condition, comprising vehicle speed, of the hydraulic hybrid vehicle;
   comparing the vehicle speed of the driving condition of the hydraulic hybrid vehicle with an upper predetermined threshold speed limit and a lower predetermined threshold speed limit;
   determining when the vehicle speed of the driving condition is higher than the upper predetermined threshold speed limit and, when the vehicle speed is higher than the upper predetermined threshold speed limit:
  determining, based on the driving condition, control parameters for operating the first hydraulic machine;
  controlling the control parameters of the first hydraulic machine for operating the first hydraulic machine;
  determining when the vehicle speed of the driving condition is lower than the lower predetermined threshold speed limit and, when the vehicle speed is lower than the lower predetermined threshold speed limit:
  determining, based on the driving condition, control parameters for operating the second hydraulic machine; and
  controlling the control parameters of the second hydraulic machine for operating the second hydraulic machine as a motor by adding propulsion torque from the second hydraulic machine to the third pair of wheels.

2. The method according to claim 1, comprising controlling the control parameters of the first hydraulic machine for operating the first hydraulic machine as a motor by adding propulsion torque from the first hydraulic machine to the second pair of wheels.

3. The method according to claim 1, the driving condition comprising an indication of an undesired reduction of vehicle speed, the method comprising the steps of:
  comparing the undesired reduction of vehicle speed with a predetermined speed reduction threshold rate;
  determining when the undesired reduction of vehicle speed reduces faster than the predetermined speed reduction threshold rate and, when the vehicle speed reduces faster than the predetermined speed reduction threshold rate:
    controlling the control parameters of the first hydraulic machine for operating the first hydraulic machine as a motor by adding propulsion torque from the first hydraulic machine to the second pair of wheels.

4. The method according to claim 1, the driving condition comprising an indication of an inclination of a road gradient of the hydraulic hybrid vehicle, the method comprising the steps of:
  comparing the inclination of the road gradient with a predetermined inclination threshold limit;
  determining when the inclination of the road gradient is larger than the predetermined inclination threshold limit and, when the inclination of the road gradient is larger than the predetermined inclination threshold limit:
    controlling the control parameters of the first hydraulic machine for operating the first hydraulic machine as a motor by adding propulsion torque from the first hydraulic machine to the second pair of wheels.

5. The method according to claim 1, the driving condition comprising an indication of a change in accelerator pedal position, the method comprising the steps of:
  measuring an acceleration of the hydraulic hybrid vehicle in response to the change in accelerator pedal position;
  comparing the measured acceleration of the hydraulic hybrid vehicle with a predetermined vehicle acceleration threshold limit;
  determining if the measured acceleration is lower than the predetermined vehicle acceleration threshold limit and, when the measured acceleration is lower than the predetermined vehicle acceleration threshold limit:
    controlling the control parameters of the first hydraulic machine for operating the first hydraulic machine as a motor by adding propulsion torque from the first hydraulic machine to the second pair of wheels.

6. The method according to claim 1, the hydraulic hybrid vehicle comprising a liftable wheel axle, the second pair of wheels being connected to the liftable wheel axle, wherein the driving condition comprises an indication of a wheel axle load pressure of the liftable wheel axle, the method comprising the steps of:
  comparing the wheel axle load pressure of the liftable wheel axle with a maximum allowable load pressure threshold limit;
  determining when the wheel axle load pressure of the liftable wheel axle is lower than the maximum allowable load pressure threshold limit and, when the wheel axle load pressure of the liftable wheel axle is lower than the maximum allowable load pressure threshold limit:
    controlling the liftable wheel axle to be positioned in a state where the second pair of wheels are not in contact with the ground.

7. The method according to claim 1, the hydraulic propulsion system comprising a hydraulic accumulator in fluid communication with the first hydraulic machine.

8. The method according to claim 7, comprising controlling the control parameters of the first hydraulic machine for operating the first hydraulic machine as a hydraulic pump by supplying hydraulic fluid from the first hydraulic machine to the hydraulic accumulator.

9. The method according to claim 7, the driving condition comprising an indication of an inclination of a downhill slope of the hydraulic hybrid vehicle, the method comprising the steps of:
  comparing the inclination of the downhill slope with a predetermined minimum threshold inclination limit;
  determining when the inclination of the downhill slope is higher than the predetermined minimum threshold inclination limit and, when the inclination of the downhill slope is higher than the predetermined minimum threshold inclination limit:
    controlling the control parameters of the first hydraulic machine for operating the first hydraulic machine as a pump for supplying hydraulic fluid to the hydraulic accumulator.

10. The method according to claim 7, the driving condition comprising an indication of an amount of hydraulic fluid being present in the hydraulic accumulator; the method comprising the steps of:
  comparing the amount of hydraulic fluid present in the hydraulic accumulator with a predetermined threshold limit;
  determining when the amount of hydraulic fluid in the hydraulic accumulator is larger than the predetermined threshold limit and, when the amount of hydraulic fluid in the hydraulic accumulator is larger than the predetermined threshold limit:
    controlling the internal combustion engine to reduce propulsion torque to the first pair of wheels using control parameters of the internal combustion engine; and
    controlling the control parameters of the first hydraulic machine for operating the first hydraulic machine as a motor by adding propulsion torque from the first hydraulic machine to the second pair of wheels.

11. A computer comprising a computer program for performing the steps of claim 1 when the computer program is run on the computer.

12. A non-transitory computer readable medium carrying a computer program for performing the steps of claim 1 when the computer program is run on a computer.

13. A control unit for controlling a hydraulic hybrid vehicle, the hydraulic hybrid vehicle comprising:
- a first pair of wheels, a second pair of wheels, and a third pair of wheels;
- an internal combustion engine connected to the first pair of wheels for propelling the hydraulic hybrid vehicle; and
- a hydraulic propulsion system comprising a first hydraulic machine connected to the second pair of wheels, and a second hydraulic machine connected to the third pair of wheels, wherein the control unit is configured to:
- receive a signal indicative of a driving condition, comprising vehicle speed, of the hydraulic hybrid vehicle;
- compare the vehicle speed of the driving condition of the hydraulic hybrid vehicle with an upper predetermined threshold speed limit and a lower predetermined threshold speed limit;
- determine when the vehicle speed of the driving condition is higher than the upper predetermined threshold speed limit and, when the vehicle speed is higher than the upper predetermined threshold speed limit:
  - determine, based on the driving condition, control parameters for operating the first hydraulic machine;
  - control the control parameters of the first hydraulic machine for operating the first hydraulic machine;
- determine when the vehicle speed of the driving condition is lower than the lower predetermined threshold speed limit and, when the vehicle speed is lower than the lower predetermined threshold speed limit:
  - determine, based on the driving condition, control parameters for operating the second hydraulic machine; and
  - control the control parameters of the second hydraulic machine for operating the second hydraulic machine as a motor by adding propulsion torque from the second hydraulic machine to the third pair of wheels.

14. A hydraulic hybrid vehicle comprising:
- a first pair of wheels, a second pair of wheels, and a third pair of wheels;
- an internal combustion engine connected to the first pair of wheels and arranged for propelling the hydraulic hybrid vehicle; and
- a hydraulic propulsion system comprising a first hydraulic machine connected to the second pair of wheels and a second hydraulic machine connected to the third pair of wheels, wherein the hydraulic hybrid vehicle comprises a control unit configured to:
- receive a signal indicative of a driving condition, including vehicle speed, of the hydraulic hybrid vehicle;
- compare the vehicle speed of the driving condition of the hydraulic hybrid vehicle with an upper predetermined threshold speed limit and a lower predetermined threshold speed limit;
- determine when the vehicle speed of the driving condition is higher than the upper predetermined threshold speed limit and, when the vehicle speed is higher than the upper predetermined threshold speed limit:
  - determine, based on the driving condition, control parameters for operating the first hydraulic machine; and
  - control the control parameters of the first hydraulic machine for operating the first hydraulic machine;
- determine when the vehicle speed of the driving condition is lower than the lower predetermined threshold speed limit and, when the vehicle speed is lower than the lower predetermined threshold speed limit:
  - determine, based on the driving condition, control parameters for operating the second hydraulic machine; and
  - control the control parameters of the second hydraulic machine for operating the second hydraulic machine as a motor by adding propulsion torque from the second hydraulic machine to the third pair of wheels.

15. The hydraulic hybrid vehicle according to claim 14, wherein the hydraulic hybrid vehicle comprises a liftable wheel axle, wherein the second pair of wheels is connected to the liftable wheel axle.

16. The hydraulic hybrid vehicle according to claim 14, wherein each wheel of the first pair of wheels comprises an individual first hydraulic machine.

17. The hydraulic hybrid vehicle according to claim 14, wherein the first hydraulic machine is connected to a differential gearing arrangement for distribution of torque from the first hydraulic machine to each of the wheels of the first pair of wheels.

18. The hydraulic hybrid vehicle according to claim 14, wherein the hydraulic propulsion system comprises a transmission arrangement, the transmission arrangement being connected downstream from the first hydraulic machine and upstream from the first pair of wheels.

19. The hydraulic hybrid vehicle according to claim 14, wherein the hydraulic propulsion system comprises a hydraulic accumulator n fluid communication with the first hydraulic machine.

20. The hydraulic hybrid vehicle according to claim 19, wherein the hydraulic propulsion system comprises a hydraulic pump in fluid communication with the hydraulic accumulator.

21. The hydraulic hybrid vehicle according to claim 20, wherein the hydraulic pump is connected to the internal combustion engine of the hydraulic hybrid vehicle.

22. The hydraulic hybrid vehicle according to claim 20, wherein the hydraulic pump is propelled by an electric rotor electrically connected to an electric power system of the hydraulic hybrid vehicle.

23. The hydraulic hybrid vehicle according to claim 14, wherein the hydraulic hybrid vehicle further comprises a converter dolly positioned between a tractor unit and a trailer unit of the hydraulic hybrid vehicle.

24. The hydraulic hybrid vehicle according to claim 23, wherein the second and third pair of wheels are connected to the converter dolly.

* * * * *